United States Patent
Kanno

(10) Patent No.: US 6,484,693 B1
(45) Date of Patent: Nov. 26, 2002

(54) SENSOR CONTROL FOR ENGINE

(75) Inventor: Isao Kanno, Shizuoka (JP)

(73) Assignee: Sanshin Kogyo Kabushiki Kaisha (JP)

( * ) Notice: Subject to any disclaimer, the term of this patent is extended or adjusted under 35 U.S.C. 154(b) by 0 days.

(21) Appl. No.: 09/710,696

(22) Filed: Nov. 9, 2000

(30) Foreign Application Priority Data

Nov. 9, 1999 (JP) .......................................... 11-318549

(51) Int. Cl.$^7$ ................................................ F02M 3/07
(52) U.S. Cl. ........................... 123/339.15; 123/339.25; 701/114
(58) Field of Search ........................... 123/399, 339.15, 123/339.25, 339.26; 701/114

(56) References Cited

U.S. PATENT DOCUMENTS

| | | | |
|---|---|---|---|
| 4,622,936 A | * 11/1986 | Junginger et al. | 123/399 |
| 5,033,431 A | * 7/1991 | Poirier et al. | 123/399 |
| 5,146,899 A | 9/1992 | Tanaka et al. | |
| 5,181,493 A | 1/1993 | Motoyama et al. | |
| 5,199,401 A | * 4/1993 | O'Neill | 123/399 |
| 5,367,998 A | 11/1994 | Shiohara et al. | |
| 5,445,126 A | * 8/1995 | Graves, Jr. | 123/399 |
| 5,448,974 A | 9/1995 | Toda | |
| 5,476,426 A | 12/1995 | Nakamura et al. | |
| 5,665,025 A | 9/1997 | Katoh | |
| 5,967,118 A | * 10/1999 | Hsu et al. | 123/399 |
| 6,148,777 A | 11/2000 | Motose et al. | |

* cited by examiner

*Primary Examiner*—Erick Solis
(74) *Attorney, Agent, or Firm*—Knobbe, Martens, Olson & Bear, LLP.

(57) ABSTRACT

A method and apparatus for providing corrected throttle valve opening data to the ECU for calculation of various engine parameters includes computing a throttle opening adjustment value H by subtracting a sensed throttle valve opening S from a actual throttle valve opening D at engine idle. An adjusted throttle valve opening K is computed throughout the range of throttle openings by adding the adjustment value H to the sensed throttle valve opening S. In this manner, an erroneous sensed throttle valve opening S is corrected by the adjustment value H. The process of determining the throttle valve adjustment value preferably is performed at the engine idle state and can be triggered by a physical trigger; by connecting and disconnecting certain electronic devices from the ECU according to a prescribed pattern; by shifting an outboard motor from a neutral to a forward or reverse state; or by other triggering means.

29 Claims, 10 Drawing Sheets

SENSOR CONTROL FOR ENGINE

PRIORITY INFORMATION

This application is based on and claims priority to Japanese Patent Application No. Hei 11-318549, filed Nov. 9, 1999, the entirely of which is hereby expressly incorporated by reference.

BACKGROUND OF THE INVENTION

1. Field of the Invention

This invention relates to a control system for an engine, and more particularly to an apparatus and method for calibrating a throttle valve sensor in the control system.

2. Description of the Art

In all fields of engine design, there is an increasing emphasis on obtaining more effective emission control, better fuel economy and, at the same time, increasing power output. Efforts are being made to maximize the performance of individual engine systems in order to maximize overall engine performance.

Control systems are currently employed to control the various aspects and systems of the engine, such as air intake, fuel injection, timing, etc. Sensors are provided at various locations throughout the engine. These sensors detect specific engine conditions and transmit an electronic signal indicative of such conditions to an electronic control unit "ECU." The ECU controls the engine systems in response to inputs from the sensors. For instance, in some configurations, an engine speed sensor and a throttle valve position sensor are provided and respective signals from these sensors are used by the ECU to determine suitable fuel amounts during operation of the engine. The desired fuel amounts for specific conditions can be defined in a control map stored in the ECU and can depend upon both engine speed and throttle valve position.

Faulty sensor data can confuse the ECU and/or can cause the ECU to control the engine in a manner that does not maximize performance. It is thus important to obtain accurate sensor readings. However, due to errors during sensor assembly and to variations in power voltage, there is often a deviation between an actual throttle opening angle and a throttle opening angle detected by the throttle opening sensor. Because the ECU determines control based upon this erroneous reading, the ECU may direct delivery of fuel in amounts that do not optimal engine performance for the giving engine running conditions. Also, the ECU may not be able to correctly determine when the throttle valve is in the idle state.

SUMMARY OF THE INVENTION

The present invention involves the recognition of the above-stated problem and the further recognition that better engine control can be achieved by having the engine control system compensate for the inaccuracies in the sensed throttle valve positions due to errors during sensor assembly and to variations in power voltages.

One aspect of the present invention thus an internal combustion engine with an engine control system. The internal combustion engine includes a cylinder block defining at least one cylinder bore. A piston reciprocates within the cylinder bore. A cylinder head closes an end of the cylinder bore to define a combustion chamber together with the cylinder bore and the piston. An air induction system is arranged to introduce air to the combustion chamber. The air induction system includes an air intake passage and a throttle valve, and the control system includes a throttle valve opening sensor and a control unit. The control unit controls at least one fuel injector. The throttle valve is moveably disposed within the air intake passage and admits air in proportion to an opening degree thereof. The throttle valve opening sensor is arranged to sense the opening degree and to output a signal indicative of the opening degree to the control unit. The fuel injector is arranged to supply fuel to the combustion chamber. The control unit is configured to determine an amount of fuel to be supplied at least based upon the opening degree signal. The control unit has a memory having an actual opening degree of the throttle valve at an engine idle position stored therein and having a correction value stored therein. The control unit is further configured to determine the correction value as a difference between the stored actual opening degree of the throttle valve at engine idle and an opening degree signal sensed by the throttle valve opening sensor at engine idle.

Another aspect of the present invention involves a method for controlling an engine. The engine includes a fuel injector, an air intake passage having a throttle valve, a throttle valve opening sensor, and a control unit having a memory. The throttle valve is movable between an idle position and a second position. The throttle valve opening sensor is adapted to sense the opening degree and to output a signal indicative of the opening degree to the control unit. An actual opening degree of the throttle valve at the idle position is precisely measured and is then stored in the memory. The throttle valve opening sensor senses the throttle valve opening degree when the throttle is at the idle position and sends an idle opening degree signal to the control unit. A correction value is determined by computing the difference between the stored actual idle opening degree and the sensed idle opening degree signal. The correction value is stored in the memory. An adjusted throttle opening degree is determined by applying the correction value to the opening degree signal from the throttle valve opening sensor.

Further aspects, features, and advantages of this invention will become apparent from the detailed description of the preferred embodiment which follows.

BRIEF DESCRIPTION OF THE DRAWINGS

These and other features, aspects and advantages of the present invention will now be described with reference to the drawings of preferred embodiments which are intended to illustrate and not to limit the invention. The drawings comprise eight figures.

DETAILED DESCRIPTION OF PREFERRED EMBODIMENTS OF THE INVENTION

Figure 1:
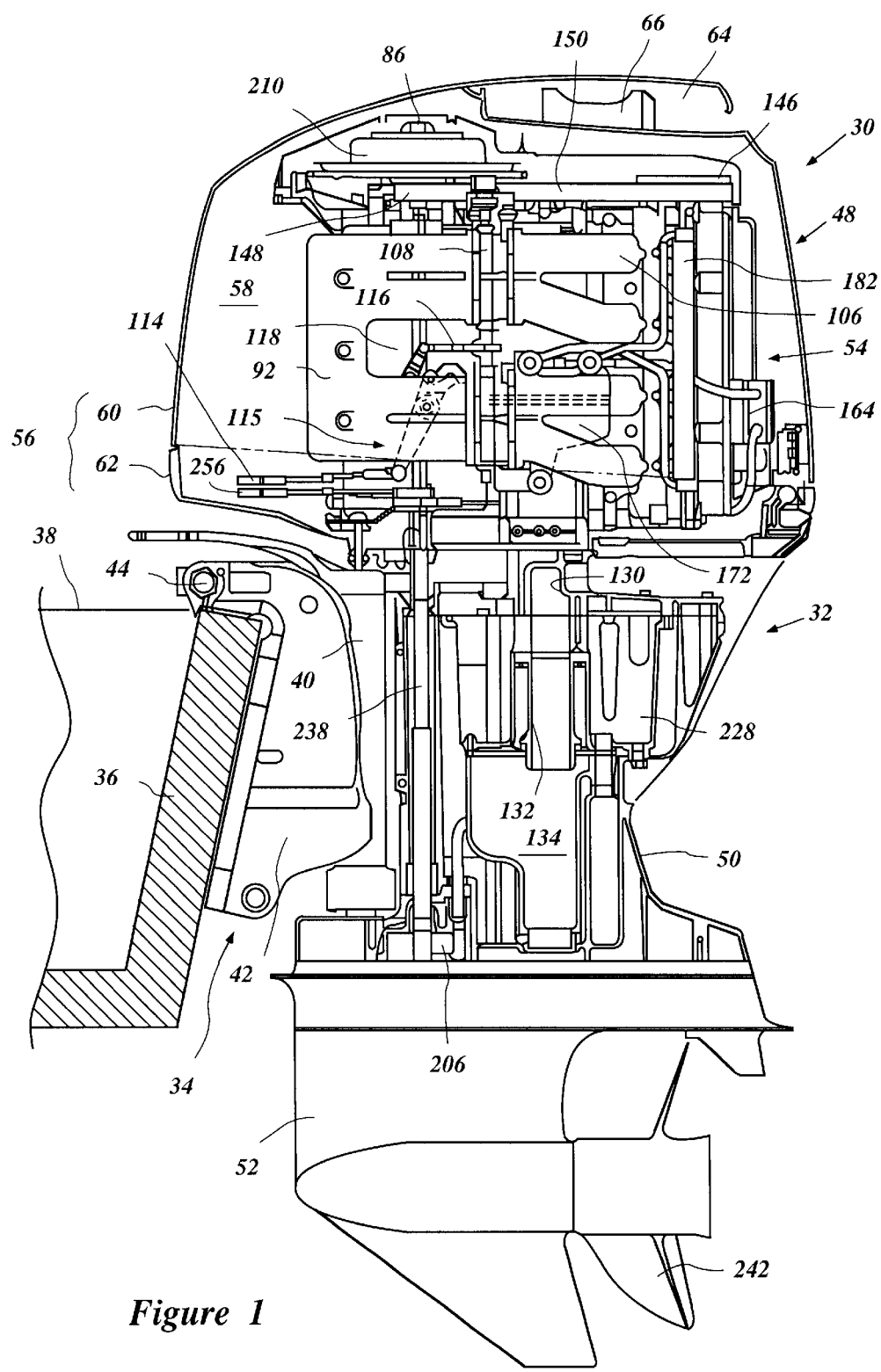
FIG. 1 is a side elevation wire frame view of an outboard motor that employs a fuel injection control system configured in accordance with certain features, aspects and advantages of the present invention. An associated watercraft is partially illustrated.

With reference to FIGS. 1–6, an overall construction of an outboard motor 30, which employs a control system arranged and configured in accordance with certain features, aspects and advantages of the present invention, will be described. Although the present invention is shown in the context of an outboard motor engine, various features, aspects and advantages of the present invention also can be employed with engines used in other types of marine drives (e.g., a stem drive unit and in-board/outboard drives) and also, for example, with engines used in land vehicles (i.e., motorcycles, snowmobiles and all terrain vehicles) and stationary engines (i.e., generators).

In the illustrated arrangement, the outboard motor 30 comprises a drive unit 32 and a bracket assembly 34. The bracket assembly 34 supports the drive unit 32 on a transom 36 of an associated watercraft 38. The drive unit 32 preferably is disposed such that a marine propulsion device is placed in a submerged position with the watercraft 38 resting on the surface of a body of water. The bracket assembly 34 preferably comprises a swivel bracket 40, a clamping bracket 42, a steering shaft and a pivot pin 44.

As is known, the steering shaft typically extends through the swivel bracket 40 and is affixed to the drive unit 32. The steering shaft is journaled for steering movement about a generally vertically extending steering axis, which is defined within the swivel bracket 40.

The clamping bracket 34 preferably includes a pair of bracket arms that are spaced apart from each other and that are affixed to the watercraft transom 36. The pivot pin 44 completes a hinge coupling between the swivel bracket 40 and the clamping bracket 42. The pivot pin 44 extends through the bracket arms so that the clamping bracket 42 supports the swivel bracket 40 for pivotal movement about a generally horizontally extending tilt axis, which is defined by the pivot pin 44. The illustrated drive unit 32 thus can be tilted or trimmed about the pivot pin 44.

As used through this description, the terms "forward," "forwardly" and "front" mean at or to the side where the bracket assembly 36 is located, and the terms "rear," "reverse," "backwardly" and "rearwardly" mean at or to the opposite side of the front side, unless indicated otherwise or otherwise readily apparent from the context use.

A hydraulic tilt and trim adjustment system preferably extends between the swivel bracket 40 and the clamping bracket 42 to raise or lower the swivel bracket 40 and the drive unit 32 relative to the clamping bracket 34. In other arrangements, the outboard motor 30 can have a manually operated system for raising and lowering the drive unit 32.

The illustrated drive unit 32 includes a power head 48, a driveshaft housing 50 and a lower unit 52. The power head 48 is disposed atop the drive unit 32 and includes an internal combustion engine 54, which is positioned within a protective cowling 56. The protective cowling 56 in the illustrated arrangement defines a generally closed engine compartment 58. The protective cowling 56 preferably comprises a top cowling member 60 and a bottom cowling member 62. The top cowling member 60 can be detachably affixed to the bottom cowling 62 so that the operator can access the engine 54 for maintenance or other purposes.

The top cowling 60 preferably comprises a pair of air intake compartments 64 at both rear sides thereof. Each compartment 64 has an air duct 66 that extends generally vertically in the compartment 64. The air intake compartments 64 communicate with the closed cavity 58 through the air ducts 66 so that an ambient air can be introduced into the cavity 58 and to the engine 54 for combustion.

The engine 54 preferably operates on a four-stroke combustion principle. The illustrated engine 54 comprises a cylinder block 70 that defines four cylinder bores 72. The cylinder bores 72 are generally horizontally extending and are vertically spaced from one another. This type of engine, however, is exemplary of an engine on which various features, aspects and advantages of the present invention can be used. Engines having other number of cylinder bores, having other cylinder arrangements and operating on other combustion principles (e.g., two-stroke crankcase combustion or rotary) all can use at least some of the features, aspects or advantages described herein.

A piston 76 can reciprocate in each cylinder bore 72. In the illustrated arrangement, a cylinder head assembly 78 is affixed to one end of the cylinder block 70 and, together with the pistons 76 and the cylinder bores 72, defines four combustion chambers 80. A crankcase member preferably closes the other end of the cylinder block 70. Together, the cylinder block 70 and the crankcase member 82 at least partially define a crankcase chamber 84. A crankshaft 86 extends generally vertically through the crankcase chamber 84. The crankshaft 86 preferably is connected to the pistons 76 by connecting rods 87 and is rotated by the reciprocal movement of the pistons 76. In the illustrated arrangement, the crankcase member 82 is located at the most forward position with the cylinder block 70 and the cylinder head assembly 78 extends rearward from the crankcase member 82.

The engine 54 includes an air induction system 88 through which air is introduced into the combustion chambers 80. The induction system 88 preferably includes a plenum chamber 92, four air intake passages 94 and eight intake ports 96. As will be recognized, the number of intake passages and ports can vary. The intake ports 96 are defined in the cylinder head assembly 78. In the illustrated arrangement, two of the intake ports 96 are associated with a single intake passage 94 and both of the intake ports 96 open into a single combustion chamber 80.

The intake ports 96 are repeatedly opened and closed by intake valves 98. When intake ports 96 are opened, the respective intake passages 94 communicate with the associated combustion chambers 80.

The plenum chamber 92 functions as an intake silencer and/or a coordinator of air charges. In the illustrated arrangement, a plenum chamber member 100 defines the plenum chamber 92 and is mounted on the port side of the crankcase member 82. The plenum chamber member 92 preferably has an air inlet opening (not shown) that opens to the closed cavity 58. The illustrated intake passages 94 extend rearwardly from the plenum chamber member 100 along the cylinder block 70 on the port side and then bend toward the intake ports 96. Air is taken into the plenum chamber 92 from the cavity or engine compartment through the inlet opening. The air then is introduced into the combustion chambers 80 through the intake passages 94 and the intake ports 80.

The illustrated intake passages 94 are defined by intake ducts 104, which are preferably formed with the plenum chamber member 100, intake manifolds 106 connected to the associated intake ports 96, and throttle bodies 108 interposed between the intake ducts 104 and the intake manifolds 106. In the illustrated arrangement, the respective throttle bodies 108 support butterfly-type throttle valves 110 in a manner that allows pivotal movement of the valves 110 about axes defined by valve shafts 111 that extend generally vertically. The valve shafts 111 preferably are linked together to form a single valve shaft assembly 112 that passes through all of the throttle bodies 108.

The valve shaft assembly 112 can be operable by the watercraft operator through a suitable mechanism including a throttle cable 114, a non-linear linkage 115, a control lever 116 and a bias spring 117. In the illustrated arrangement, the control lever 116 and the bias spring 117 generally are placed in a space 118 defined between the two upper intake passages 94 and the two lower intake passages 94. When the operator operates the throttle cable 114, the mechanism actuates the valve shaft assembly 112 to open the throttle valves 110. Conversely, when the throttle cable 114 is released, the mechanism actuates the valve shaft assembly 112 to close the throttle valves 110. Preferably, the spring 117 operates to close the valves when the opening force provided by the cable 114 is removed or reduced. A rapid closing of the throttle valve, as used herein, occurs when the valves are closed by the restorative force of the spring 117 without any opening biasing force provided by the throttle cable 114.

The throttle valves 110 thus admit a proper amount of air into the intake passages 94 in proportion to an opening degree or opening position thereof. In other words, a certain amount of air regulated by the throttle valves 110 is introduced into the combustion chambers 80 through the intake passages 94. Under a normal running condition, the larger the amount of the air, the higher the speed of the engine operation.

The throttle valves 110 are in a generally closed position when the engine is in the idle state. The throttle valves 110 preferably do not completely close, even at engine idle. Instead, movement of the throttle valves 110 is preferably stopped at a throttle opening angle θ of approximately one degree (1°) so as to allow a small amount of air to flow therethrough. This small amount of air keeps the engine operation in an idle state.

Figure 6:
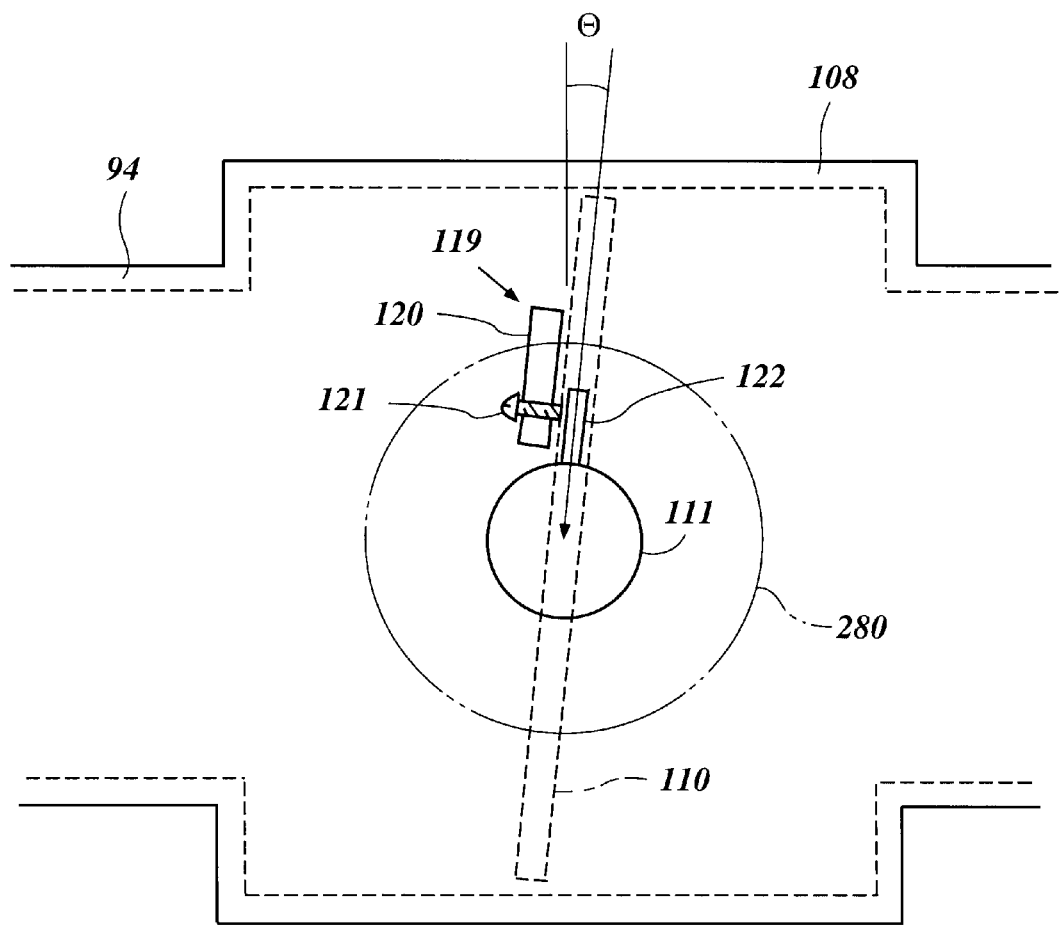
FIG. 6 is a top plan view of a throttle body portion of an air induction system associated with the engine of FIG. 1.

With more specific reference to FIG. 6, a stop 119 is provided for preventing the throttle valves 110 from completely closing. The stop 119 includes a support portion 120 which supports an adjustable bolt 121. The bolt extends from the support 120 and engages an engagement portion 122 to prevent the throttle valves 110 from closing completely. As discussed above, the spring 117 operates to close the valves when an opening force provided by the cable 114 is removed or reduced. Thus, at engine idle, when no opening force is provided to counteract the spring, the spring urges the throttle valves 110 to close and the engagement portion 122 firmly engages the bolt 121.

It is to be understood that the bolt 121 can be adjustable so that the throttle opening angle θ at idle can be adjusted during engine manufacture and service. Additionally, in the illustrated embodiment, a support 120 and engagement portion 122 are provided for every throttle valve 110. It is to be understood that additional embodiments can employ a single support 120 or many supports 120 adapted to interact with a corresponding engagement portion 122 extending from the valve shaft assembly 112.

Figure 2:
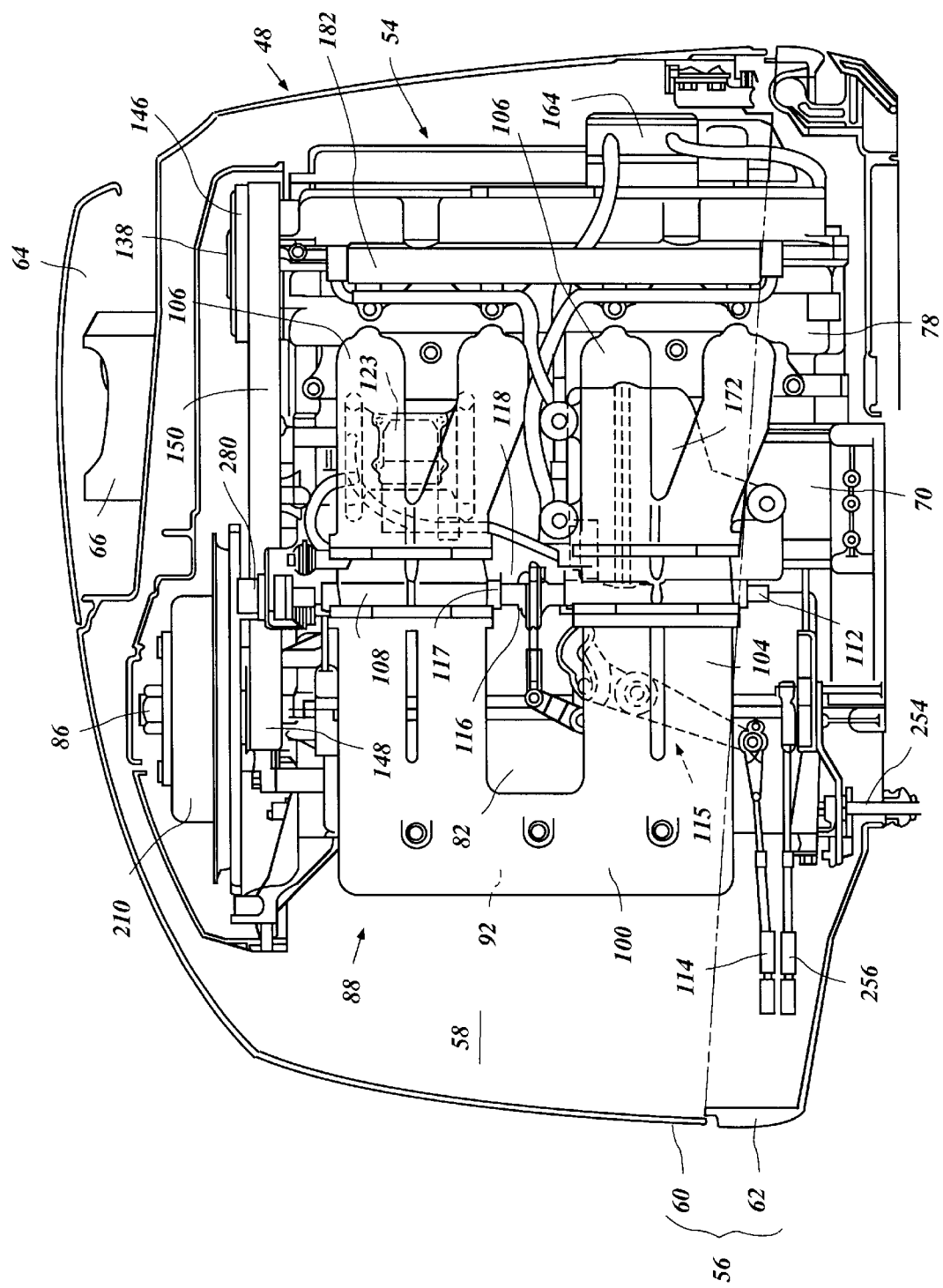
FIG. 2 is an enlarged side view of a power head. A protective cowling is shown in section.

To further facilitate provision of air during idle, small holes can be formed in the throttle valve 110 or a bypass passage can be arranged to allow a small amount of air flow even if the throttle valves are completely closed. In order to maintain idle speed, an idle air adjustment unit 123 can be additionally provided. This alternative induction system is shown in FIG. 2. An auxiliary passage is coupled with one of the intake passages 94 to bypass the throttle valve 110. The auxiliary passage can have an idle air adjustment valve. An opening degree of the adjustment valve preferably is controlled electrically by, for example, an ECU which will be described later.

Although the valve shafts 111 of the illustrated embodiment are substantially vertically-oriented, it is to be understood that, in additional embodiments, the valve shafts may extend horizontally. Additionally, the throttle valve 110 can also be positioned in or adjacent the plenum chamber 92.

With reference again to FIGS. 1–5, the engine 54 also preferably includes an exhaust system that directs burnt air-fuel charges or exhaust gases to a location outside of the outboard motor 30. A set of exhaust ports 124 are defined in the cylinder head assembly 78 and are repeatedly opened and closed by a corresponding set of exhaust valves 126. When the exhaust ports 124 are opened, the combustion chambers 80 communicate with an exhaust manifold 128 which collects the exhaust gases and directs them away from the combustion chambers 80. The exhaust gases, in major part, are discharged into the body of water surrounding the outboard motor 30 through an exhaust passage 130 formed in an exhaust guide member, on which the engine 54 is mounted, an exhaust pipe 132 and an exhaust expansion chamber 134, which are formed in the driveshaft housing 50, and other internal passages formed in the lower unit 52.

An intake camshaft 138 and an exhaust camshaft 140 are journaled for rotation and extend generally vertically in the cylinder head assembly 78. The intake camshaft 138 actuates the intake valves 98 while the exhaust camshaft 140 actuates the exhaust valves 126. The camshafts 138, 140 have cam lobes 142 thereon to push the respective valves 98, 126. The associated ports 96, 124 are thus opened and closed repeatedly.

Preferably, the crankshaft 86 drives the camshafts 138, 140. Each camshaft 138, 140 has a sprocket 146, while the crankshaft 86 also has a sprocket 148. A timing belt or chain 150 is wound around the respective sprockets 146, 148. The crankshaft 86 therefore drives the camshafts 138, 140.

The illustrated engine 54 further includes a fuel injection system 154. The fuel injection system 154 preferably employs four fuel injectors 156 with one fuel injector allotted for each of the respective combustion chambers 80. Each fuel injector 156 has an injection nozzle that is exposed to the associated intake passage 94 such that the illustrated engine is indirectly injected. The injection nozzle preferably is opened and closed by an electromagnetic unit, such as a solenoid, which is slideable within an injection body. The electromagnetic unit generally comprises a solenoid coil, which is controlled by electrical signals. When the nozzle is opened, pressurized fuel is released from the fuel injectors 156. In the illustrated embodiment, the injection nozzle is directed toward the combustion chambers 80. Of course, in some arrangements, the fuel injectors can be disposed to inject fuel directly into the combustion chamber rather than indirectly into the combustion chamber through the induction passages. The illustrated fuel injectors 156 thus spray the fuel into the intake passages 94 during an open timing of the ports 96. The sprayed fuel enters the combustion chambers 80 with air that passes through the intake passages 94.

The fuel injection system 154 includes a fuel supply tank 160 that preferably is placed in the hull of the associated watercraft 38. In the illustrated arrangement, fuel is drawn from the fuel tank 160 by a first low pressure fuel pump 162 and a second low pressure pump 164 through a first fuel supply conduit 166. The first low pressure pump 162 preferably is a manually operated pump. The second low pressure pump 164 preferably is a diaphragm-type pump that can be operated by, for example, one of the intake and exhaust camshafts 138, 142. In this instance, the second low pressure pump 164 is mounted on the cylinder head assembly 78. A quick disconnect coupling can be provided in the first conduit 166. Also, a fuel filter 168 can be positioned in the conduit 166 at an appropriate location.

From the low pressure pump 164, fuel is supplied to a vapor separator 172 through a second fuel supply conduit 174. In the illustrated embodiment, the vapor separator 172 is mounted on the intake manifold 106. At the vapor separator end of the conduit 174, a float valve can be provided that is operated by a float 176 so as to maintain a substantially uniform level of the fuel contained in the vapor separator 172.

A high pressure fuel pump 178 is provided in the vapor separator 172. The high pressure fuel pump 178 pressurizes fuel that is delivered to the fuel injectors 156 through a delivery conduit 180. A fuel rail 182 defines a portion of the delivery conduit 180 and is mounted on the cylinder head assembly 78. The fuel rail 182 preferably supports the fuel injectors 156. The high pressure fuel pump 178 in the illustrated embodiment preferably comprises a positive displacement pump. The construction of the pump 178 thus generally inhibits fuel flow from its upstream side back into the vapor separator 172 when the pump 178 is not running. Although not illustrated, a back-flow prevention device (e.g., a check valve) also can be used to prevent a flow of fuel from the delivery conduit 180 back into the vapor separator 172 when the pump 178 is off. This later approach can be used with a fuel pump that employs a rotary impeller to inhibit a drop in pressure within the delivery conduit 180 when the pump 178 is intermittently stopped.

The high pressure fuel pump 178 is driven by a fuel pump drive motor 184 which, in the illustrated arrangement, is electrically operable and is unified with the pump 178 at its bottom portion. The drive motor 184 desirably is positioned in the vapor separator 172.

A pressure regulator 188 can be positioned along the fuel delivery conduit 180 at the vapor separator 172 and preferably limits the pressure that is delivered to the fuel injectors 156 by dumping the fuel back into the vapor separator 172.

A fuel return conduit 192 also is provided between the fuel injectors 156 and the vapor separator 126. Excess fuel that is not injected by the injector 156 returns to the vapor separator 126 through the return conduit 192.

A desired amount of the fuel is sprayed into the intake passages 94 through the injection nozzles at a selected timing for a selected duration. The injection timing and duration preferably are controlled by an ECU (electronic control unit) 194 through a control signal line 196. That is, the solenoid coil is supplied with electric power at the selected timing and for the selected duration. Because the pressure regulator 188 controls the fuel pressure, the duration can be used to determine a selected amount of fuel that will be supplied to the combustion chambers 80. Control strategies relating to the fuel injection system will be described in more detail below.

The engine 54 further includes an ignition or firing system. Each combustion chamber 80 is provided with a spark plug 200 that is connected to the ECU 194. The spark plug 200 is exposed into the associated combustion chamber 80 and ignites an air/fuel charge at a selected ignition timing. Although not shown, the ignition system preferably has an ignition coil and an igniter which are disposed between the spark plugs 200 and the ECU 194 so that an ignition timing also can be controlled by the ECU 194. In order to enhance or maintain engine performance, the ignition timing can be advanced or delayed in response to various engine running conditions. The ECU 194 and its operation will be described in greater detail below.

The ignition coil preferably is a combination of a primary coil element and a secondary coil element that are wound around a common core. Desirably, the secondary coil element is connected to the spark plugs 200 while the primary coil element is connected to the igniter. Also, the primary coil element is coupled with a power source and electrical current flows therethrough. The igniter abruptly cuts off the current flow in response to an ignition timing control signal and then a high voltage current flow occurs in the secondary coil element. The high voltage current flow forms a spark at each spark plug 200.

In the illustrated engine, air is introduced into the air intake passages 94 and fuel is injected by the fuel injectors 156 into the intake passages 94. The air and the fuel are mixed to form the air/fuel charge and this air/fuel charge flows into the combustion chambers 80 when the intake ports 96 are opened. The pistons 76 reciprocate between top dead center and bottom dead center. When the crankshaft 86 makes two rotations, the pistons 76 generally move from top dead center to bottom dead center (the intake stroke), from bottom dead center to top dead center (the compression stroke), from top dead center to bottom dead center (the power stroke) and from bottom dead center to top dead center (the exhaust stroke). During the four strokes of the pistons 76, the respective camshafts 138, 140 make one rotation. The intake camshaft 138 actuates the intake valves 98 to open the intake ports 96 during the intake stroke, while the exhaust camshaft 140 actuates the exhaust valves 126 to open the exhaust ports 124 during the exhaust stroke. Generally, at the beginning of the intake stroke, fuel is injected into the intake passage 94, and generally at the beginning of the power stroke, the spark plug 200 ignites the compressed air/fuel charge. The engine 54 continuously repeats the four strokes during operation.

During engine operation, heat builds in, for example, the cylinder block 70 and the cylinder head assembly 78. Water jackets 204 thus are provided for cooling at least these portions 70, 78. Cooling water is introduced into the water jackets 204 by a water pump 206 from the body of water surrounding the outboard motor 30 and is returned to the body of water after circulating through the cooling jackets. Thus, the engine 54 employs an open loop type cooling system.

Figure 3:
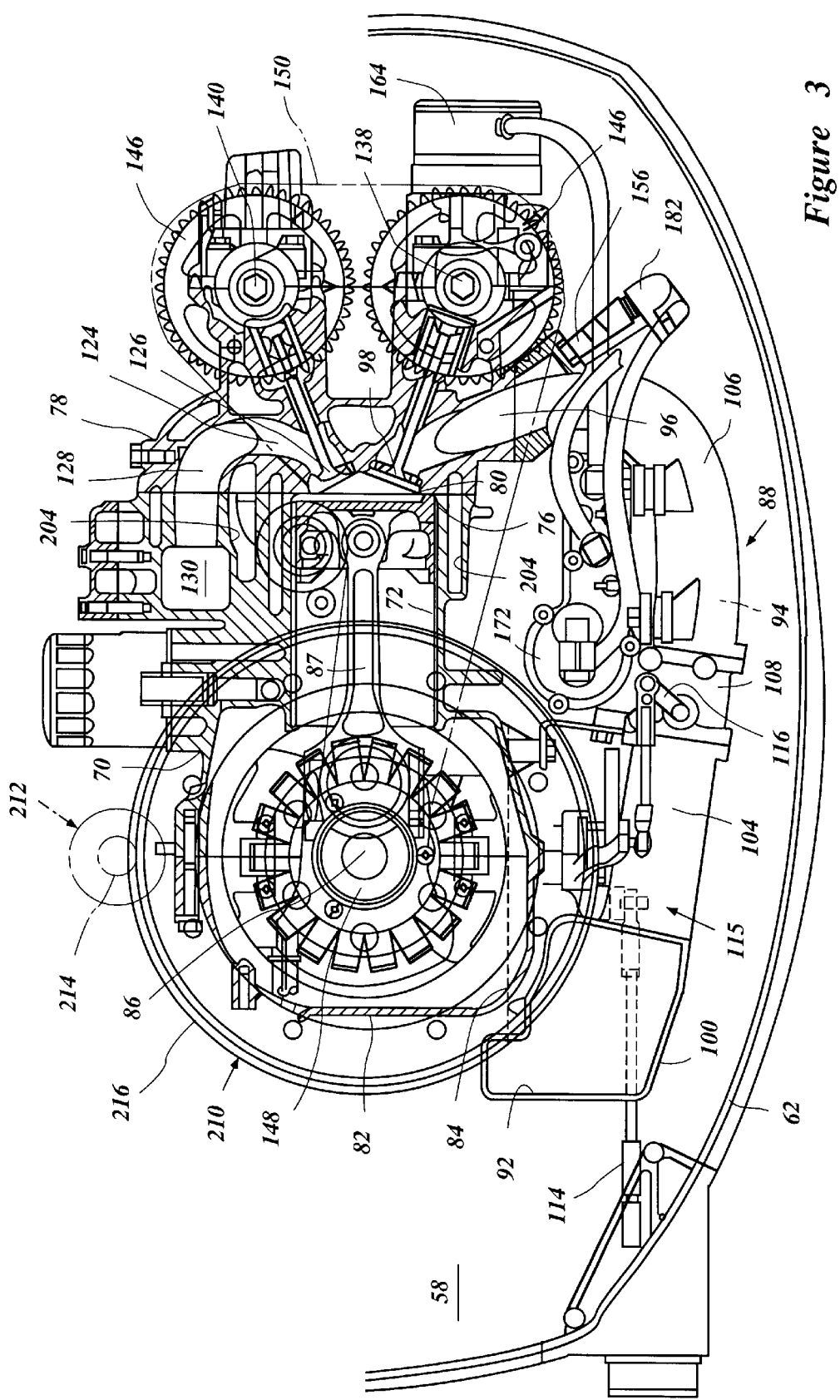
FIG. 3 is an enlarged top plan view of the power head. A top cowling member is detached and a half of a bottom cowling is omitted. A simplified view of the engine also is shown in partial section.

In the illustrated arrangement, a flywheel assembly 210 is affixed atop the crankshaft 86. The flywheel assembly 210 preferably includes an AC generator or flywheel magneto that supplies electric power to electrical components including the fuel injection system 154, the ignition system and the ECU 194. A starter motor 212 is provided for driving the crankshaft 86 to start the engine 54. As seen in FIG. 3, the starter motor 212 has a gear portion 214 that meshes with a ring gear 216 of the flywheel assembly 210. When the engine 54 starts, the starter motor 212 drives the crankshaft 68 through the gear connection. Once the engine 54 starts, however, the starter motor 212 immediately ceases operation to reduce the likelihood that the starter mechanism will be damaged.

The AC generator generates AC power and the power preferably is sent to a battery 220 placed in the hull of the watercraft 38 through a rectifier-regulator. The rectifier-regulator converts the AC power to DC power and regulates current and voltage of the power. The DC power of the battery 220 preferably is supplied to the ECU 194 through a power supply line 222 via a main switch 224. The main switch 224 has, for example, a three-position switch mechanism. The power is preferably supplied to the ECU 194 at a first position, then to heavy load equipment such as an electric motor including the fuel pump drive motor 184 at a second position, and to the starter motor 212 at a third position. The main switch 224 can be operated by the watercraft operator and can be selectively turned to any one of the positions. Moving the switch to the third position, however, starts the engine 54. The switch mechanism forcibly moves to the second position from the third position once the engine 54 has started. The main switch 224 then preferably remains in the second position under normal running conditions of the engine 54.

Figure 4:
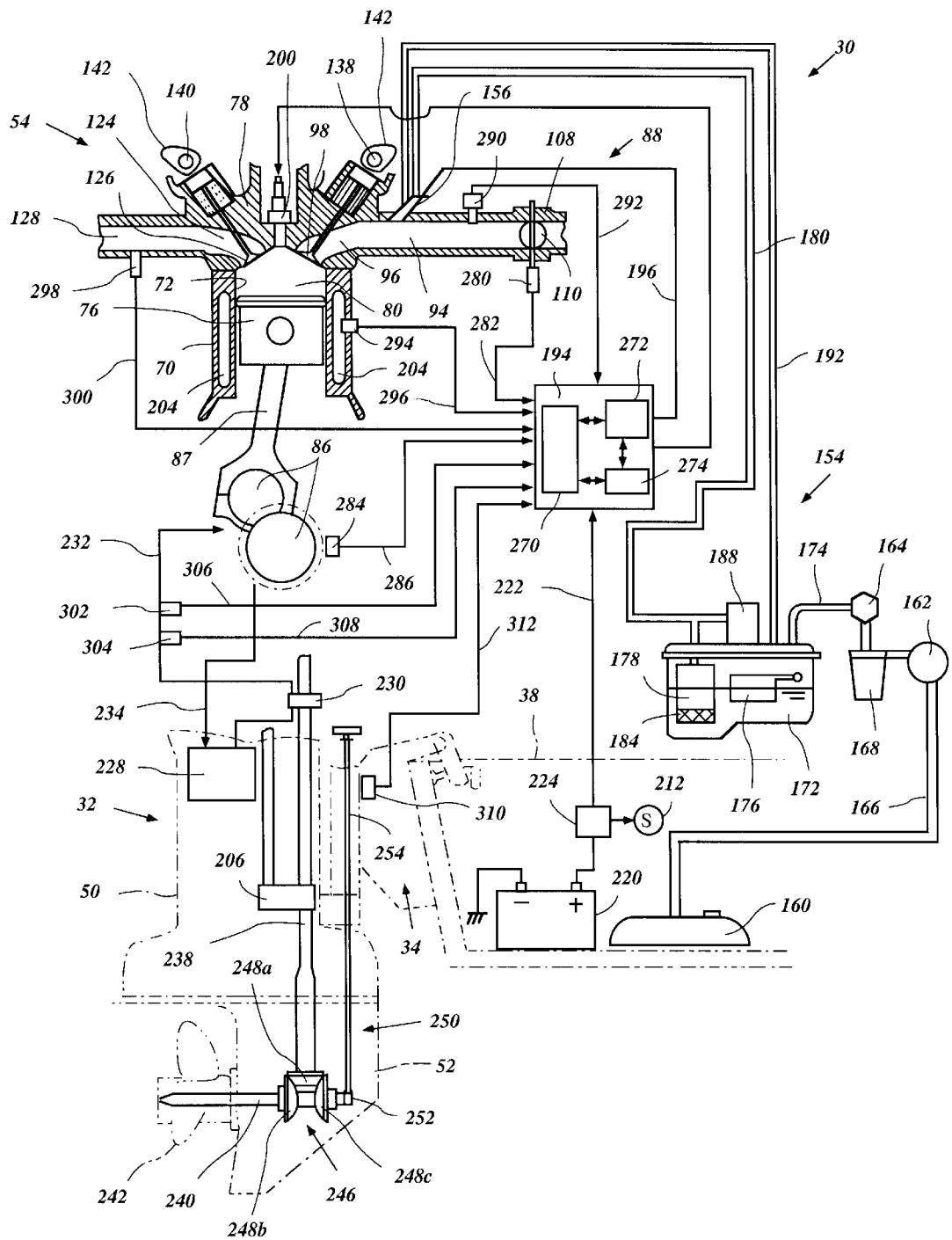
FIG. 4 is a schematic view of the outboard motor of FIG. 1. A portion of the engine is generally shown in the upper portion of the figure. A portion of the outboard motor, including a driveshaft housing and a lower unit and the associated watercraft, are shown in the lower portion of the figure. A control unit and a fuel injection system link together the two portions of the figure. The lower portion of the outboard motor and the watercraft are generally illustrated in phantom.

The engine 54 still further includes a lubrication system, which is rather schematically shown in FIG. 4, for lubricating certain portions of the engine 54 such as, for example, the interfaces between the connecting rods 88 and the crankshaft 86 and between the connecting rods 88 and the pistons 76. A lubricant reservoir 228 is disposed atop the driveshaft housing 50. Lubricant in the reservoir 228 is withdrawn by a lubricant pump 230 and then is delivered to the portions which need lubrication through a lubricant supply line 232. After lubricating the portions, the lubricant returns to the lubricant reservoir 228 through a lubricant return line 234 and which then repeats this circulation path. That is, the lubrication system preferably is formed as a closed loop.

The driveshaft housing 50 depends from the power head 48 and supports a driveshaft 238 which is driven by the crankshaft 86. The driveshaft 238 extends generally vertically through the driveshaft housing 50. The driveshaft 238 preferably drives the water pump 206 and the lubricant pump 230. As described above, the driveshaft housing 50 also defines internal passages which form portions of the exhaust system.

The lower unit 52 depends from the driveshaft housing 50 and supports a propulsion shaft 240, which is driven by the driveshaft 238. The propulsion shaft 240 extends generally horizontally through the lower unit 52. In the illustrated arrangement, the propulsion device is a propeller 242 that is affixed to an outer end of the propulsion shaft 240 and is driven thereby. The propulsion device, however, can take the form of a dual counter-rotating system, a hydrodynamic jet, or any of a number of other suitable propulsion devices.

A transmission 246 is provided between the driveshaft 238 and the propulsion shaft 240. The transmission 246 couples together the two shafts 238, 240 which lie generally normal to each other (i.e., at a 90° shaft angle) with bevel gears 248a, 248b, 248c. The outboard motor 30 has a switchover or clutch mechanism 250 that allows the transmission 246 to shift the rotational direction of the propeller 242 among forward, neutral or reverse.

In the illustrated arrangement, the switchover mechanism 250 includes a shift cam 252, a shift rod 254 and a shift cable 256. The shift rod 254 extends generally vertically through the driveshaft housing 50 and the lower unit 52. The shift cable 256 extends through the bottom cowling member 62 and then forwardly to a manipulator which is located next to a dashboard in the associated watercraft 38. The manipulator has a shift lever which is operable by the watercraft operator.

The lower unit 52 also defines an internal passage that forms a discharge section of the exhaust system, as discussed above. At engine speed above idle, the majority of the exhaust gases are discharged to the body of water surrounding the outboard motor 30 through the internal passage and finally through an outlet passage defined through the hub of the propeller 242. Of course, an above-the-water discharge can be provided for lower speed engine operation.

With reference now to FIG. 4, the ECU 194 preferably comprises a CPU (central processing unit) chip 270, memory or storage chips 272 and a timer or clock chip 274 which are electrically coupled together within a water-tight, hard box or container. The box containing the ECU 194 is mounted on an outer surface of the engine 54 or disposed at any appropriate location in the cavity 58. The respective chips preferably are formed as an LSI (large scaled integrated circuit) and can be produced in a conventional manner. The timer chip 274 can be unified with the CPU chip. The memory chips 272 preferably include at least one ROM (read only memory), at least one RAM (random access memory) and at least one EEPROM (electrical erasable programmable ROM).

The ROM is a non-volatile memory and stores the most basic control programs that can not be erased. The programs include various control routines, such as those discussed below, and possibly maps which can be uploaded to another type of storage (e.g., to RAM).

Figure 7:
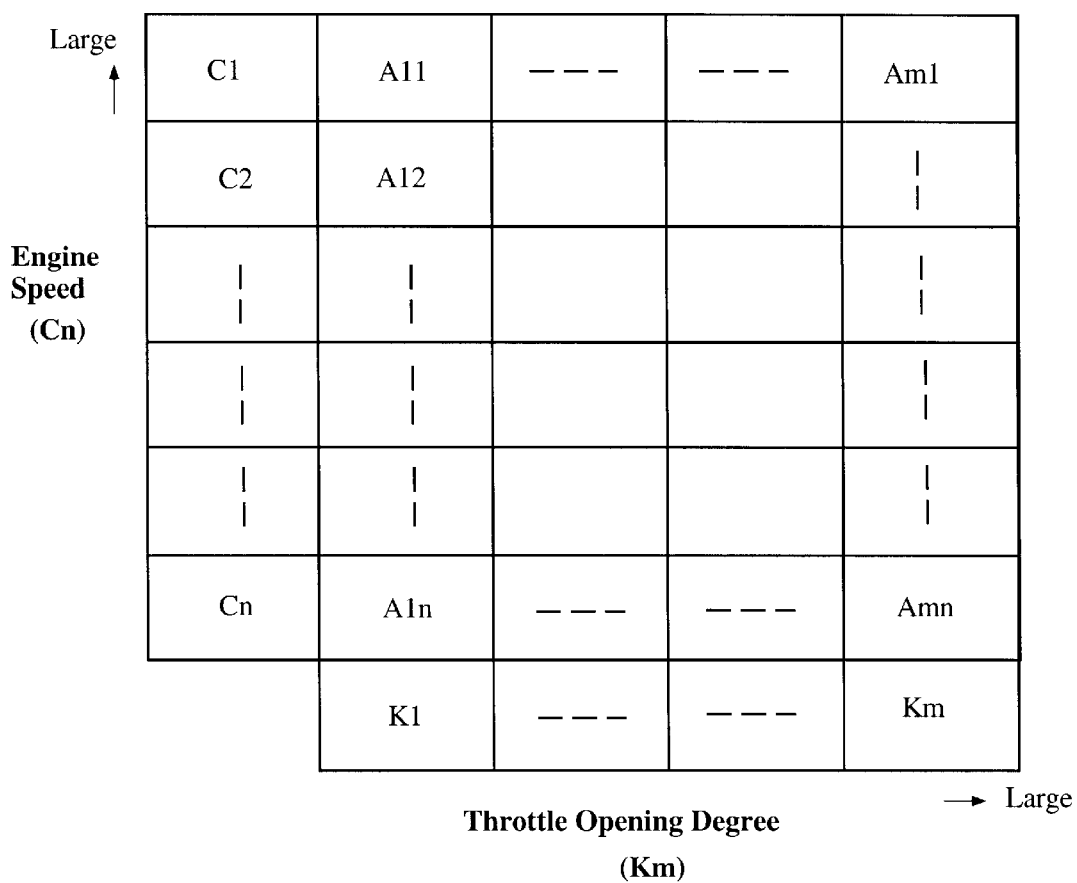
FIG. 7 is an exemplary control map used by the illustrated control unit. The horizontal axis indicates throttle valve opening degree or position, while the vertical axis indicates engine speed. Each square of the figure indicates a predetermined amount of fuel injected by a fuel injector for a given engine running condition.

The RAM is a volatile memory and stores programs and data that are erasable and rewriteable. The RAM preferably stores at least one control map, which can be three-dimensional in some arrangements. An exemplary control map is illustrated as FIG. 7. The control map preferably has a horizontal axis designating throttle opening degrees (Km), a vertical axis designating engine speeds (Cn) and squares designating amounts of fuel (Amn) corresponding to both the throttle opening degrees (Km) and the engine speeds (Cn). The respective fuel amounts can be determined to provide an optimal air/fuel ratio in any combination of the throttle opening (Km) and the engine speed (Cn). Of course, less than optimal numbers can be used, where desired. Of course, other factors, such as engine temperature and intake air pressure, can also dictate the fuel amount.

The preferred RAM also can store an adjustment map that contains a relationship between atmospheric pressures and adjustment coefficients of fuel amounts. In the adjustment map, one atmospheric pressure corresponds to one adjustment coefficient. The higher the atmospheric pressure, the greater the specific gravity of air. The adjustment coefficients therefore become greater with increase of the atmospheric pressures. The RAM further stores an engine speed data that is used for determining whether the engine 54 has started. The ECU 194 preferably determines that the engine 54 has started when the engine speed reaches 100 rpm. The engine start can be determined by other engine speeds such as 50 rpm and 150 rpm.

The EEPROM is basically a non-volatile memory but at least in part the data stored therein can be erased and rewritten. In the illustrated arrangement, the EEPROM preferably stores an intake pressure as an atmospheric pressure at which the ECU 194 has been turned on while the engine 54 stands still. More specifically, when the main switch 224 is in the first or second position but the starter motor 212 has not yet operated, i.e., the main switch 224 has not turned onto the third position, then the EEPROM stores the sensed intake pressure as a proxy for atmospheric pressure. The EEPROM is the most suitable non-volatile memory for storing this proxy value. However, other memory elements that have a non-volatile nature are, of course, applicable in practicing embodiments of the present invention. Also, it is to be understood that a dedicated atmospheric pressure sensor can be provided and used in accordance with the present invention.

As described above, the preferred ECU 194 stores a plurality of control maps or equations related to various control routines. In order to determine appropriate control indexes in the maps or to calculate them using equations based upon the control indexes determined in the maps, various sensors are provided for sensing engine conditions and other environmental conditions.

Figure 5:
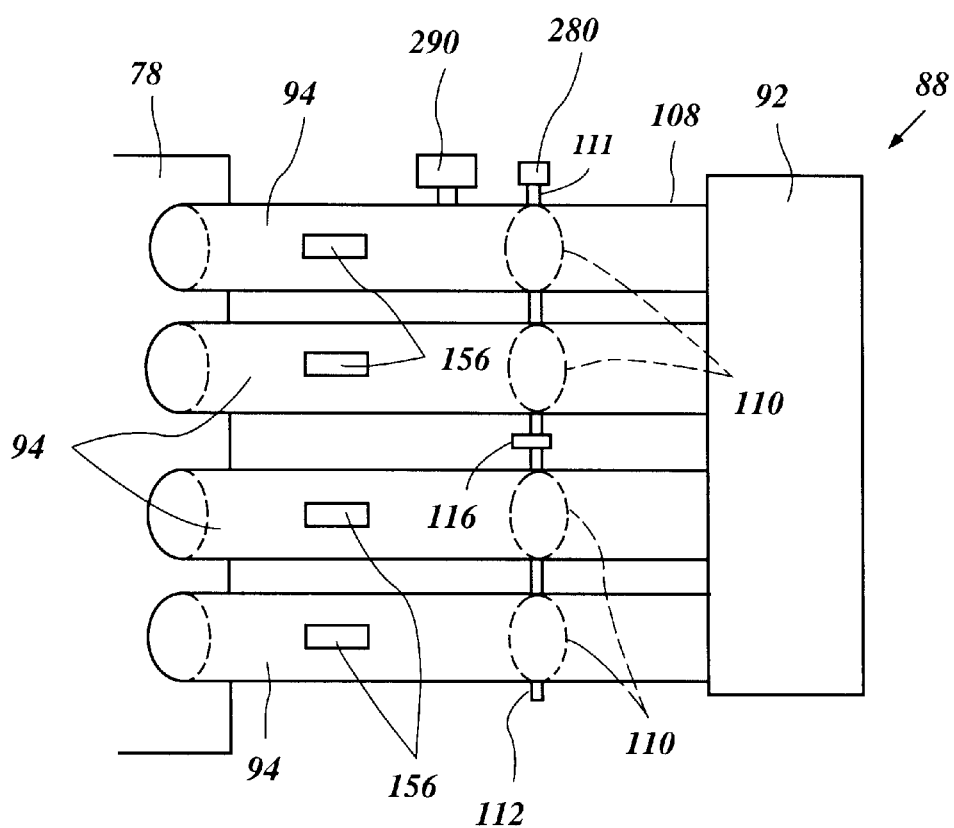
FIG. 5 is a schematic view of at least a portion of an air induction system that is associated with the engine of FIG. 1.

With primary reference to FIG. 4 and additional reference to FIGS. 2, 5 and 6, a throttle valve position sensor 280 is provided proximate the valve shaft assembly 112 to sense an opening degree or opening position of the throttle valves 110. In the illustrated embodiment, the sensor 280 is positioned at the top end of the valve shaft assembly 112. It is to be understood that the sensor 280 can be positioned in other locations such as the on the bottom or adjacent any throttle valve. Also, the sensor may be directly or indirectly mounted to the assembly 112 or mounted adjacent one of the throttle valves 110. A sensed signal is sent to the ECU 194 through a sensor signal line 282. Of course, the signals can be sent through hard-wired connections, emitter and detector pairs, infrared radiation, radio waves or the like. The type of signal and the type of connection can be varied between sensors or the same type can be used with all sensors. The sensed signal also can be used to determine a rate of change of the throttle valve position.

Associated with the crankshaft 86 is a crankshaft angle position sensor 284 which, when measuring crankshaft angle versus time, outputs a crankshaft rotational speed signal or engine speed signal that is sent to the ECU 194 through a sensor signal line 286, for example. The sensor 284 preferably comprises a pulsar coil positioned adjacent to the crankshaft 86 and a projection or cut formed on the crankshaft 86. The pulsar coil generates a pulse when the projection or cut passes proximate the pulsar coil. In some arrangement, the number of passes can be counted. The sensor 284 thus can sense not only a specific crankshaft angle but also a rotational speed of the crankshaft 86. Of course, other types of speed sensors also can be used.

An air intake pressure sensor 290 is positioned along one of the intake passages 94, preferably at the uppermost intake passage 94, at a location downstream of the throttle valve 110. The intake pressure sensor 290 primarily senses the intake pressure in this passage 94 during engine operation. The sensed signal is sent to the ECU 194 through a sensor signal line 292, for example. This signal can be used for determining engine load. In the illustrated arrangement, the sensor 290 also senses air pressure before the engine 54 starts. The sensed pressure can be a fairly accurate proxy for the atmospheric air pressure.

A water temperature sensor 294 at the water jacket 204 sends a cooling water temperature signal to the ECU 194 through a sensor signal line 296, for example. This signal represents engine temperature.

An oxygen ($O_2$) sensor 298 senses oxygen density in exhaust gases. The sensed signal is transmitted to the ECU 194 through a sensor signal line 300, for example. The signal represents air/fuel ratio and helps determine how complete combustion is within the combustion chambers.

The lubrication system has a lubricant temperature sensor 302 and a lubricant pressure sensor 304 at the lubricant supply line 232. The sensed signals are sent to the ECU 194 through a sensor signal line 306 and a sensor signal line 308, respectively, for example.

A shift position sensor 310 sends a signal indicating a position of the shift rod 254 (forward, neutral or reverse) to the ECU 194 through a sensor signal line 312, for example.

As discussed above, due to manufacturing errors and also to variations in power voltage, a sensed throttle valve opening S, which is detected by the sensor 280 and communicated to the ECU 194, is often different than the actual throttle valve opening θ. This creates a number of problems because if the ECU 194 uses the sensed throttle valve opening S instead of the actual throttle valve opening θ when determining fuel delivery volume, the air/fuel ratio is not likely to be at the optimal level for the engine running conditions. Accordingly, the engine control system provides method and apparatus for computing a throttle opening adjustment value H which, when applied to the sensed throttle valve opening value S, determines an adjusted throttle valve opening value K. The adjusted throttle opening K provides a more precise representation of the actual throttle valve θ than does the sensed throttle valve opening S. Thus, the adjusted throttle opening K allows the ECU 194 to base its calculations on more accurate data.

During engine manufacture or service, the actual throttle valve opening θ, when the engine is at the idle position, can be measured quite precisely. This actual idle opening D can be determined by adjusting the stop 119 so that a very precise throttle position at idle (i.e., one degree) is provided. In addition or in the alternative, the actual idle opening D may be determined by a highly precise sensor. Since such a sensor may be very expensive, it is preferably removed after detecting the actual idle opening D.

The actual idle opening D is input into the ECU 194, which stores the value. Preferably, this value D is stored in the non-volatile memory such as the EEPROM. In this manner, the actual idle opening D is recorded so as to allow later computation of the throttle opening adjustment value H. Storage space is also provided in the ECU 194 for the throttle opening adjustment value H. It is to be understood that both the throttle opening adjustment value H and actual idle opening D can be stored in the EEPROM memory or RAM memory, or one or the other may be stored in either of these memory types.

Figure 8:
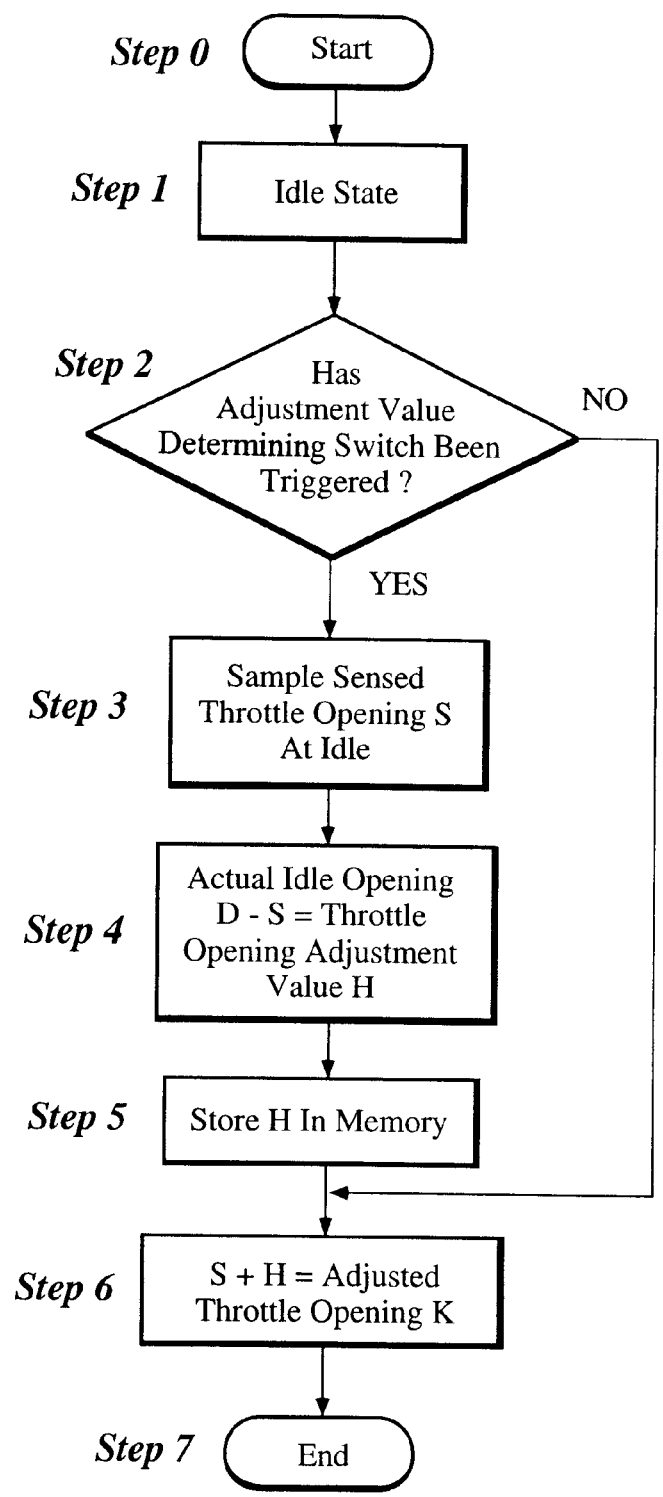
FIG. 8 is a flow chart showing a routine for determining an adjustment value of the throttle angle in accordance with a first embodiment having features in accordance with the present invention.

With reference next to FIG. 8, a flow chart shows a method for determining the throttle opening adjustment value H and also for determining the adjusted throttle opening K. In order to begin the process, the engine is first preferably placed in the idle state (step 1). In order to attain the idle state, the main switch 224 should be placed in either the first or second positions. If the switch 224 is in the first position, power is provided to the ECU 194, allowing function of the ECU. The engine does not run when the switch 224 is in the first position; thus, the throttle valves 110 are in the closed or idle position. Similarly, if the main switch 224 is in the second position but the engine has not yet been started, the throttle valves 110 are in the idle position. If the main switch 224 is in the second position and the engine has already been started, the throttle should be released so that the throttle valves 110 attain the idle state.

In order to begin the process of determining the adjustment value H, an adjustment value determining switch 320 must be triggered (step 2). The adjustment value determining switch 320 can comprise a physical switch mechanism adapted to signal the ECU 194 to begin determining the adjustment value H, or can comprise any other method or apparatus for sending such a signal to the ECU.

Once the adjustment value determining switch has been triggered (e.g., pushed or turned on), the ECU will receive a signal from the throttle valve sensor 280 indicating the sensed throttle valve opening S (step 3). The ECU 194 then determines the throttle opening adjustment value H by subtracting the sensed throttle valve opening S from the actual idle opening D (step 4). The throttle opening adjustment value H is then stored in the ECU memory (step 5).

Once the throttle opening adjustment value H has been determined and stored, the ECU 194 uses the adjustment value H to compute the adjusted throttle opening K. This is done by adding the adjustment value H to the sensed throttle valve opening S. Although the adjustment value H is determined at the engine idle position, this value can be used to determine the adjusted throttle opening K over the entire range of throttle openings. As discussed above, the adjusted throttle opening K estimates the actual throttle opening θ with greater precision and accuracy than simply the sensed throttle valve opening S.

As shown in FIG. 8, the adjustment value H is only determined when the adjustment value determining switch 320 is triggered. If the adjustment value determining switch is not triggered, then the control strategy proceeds to step 6 wherein the adjusted throttle opening K is determined by adding the sensed throttle valve opening S to the adjustment value H. Thus, once an adjustment value H is determined and stored in the ECU 194, this stored value H will be used until the adjustment value determining switch 320 is again triggered. Also, if the switch 320 is never triggered so that no adjustment value H is ever determined, the adjustment value H takes on the value of zero and the adjusted throttle opening K will actually remain the same as the sensed throttle opening S. Although the adjustment value H may have been previously determined, upon triggering of the adjustment value determining switch 320, the adjustment value H is redetermined, and the previous value is replaced. Triggering can occur during manufacturing or set-up of the engine and/or after shipping of the engine by the operator or a service/preparation personnel.

Figure 9:
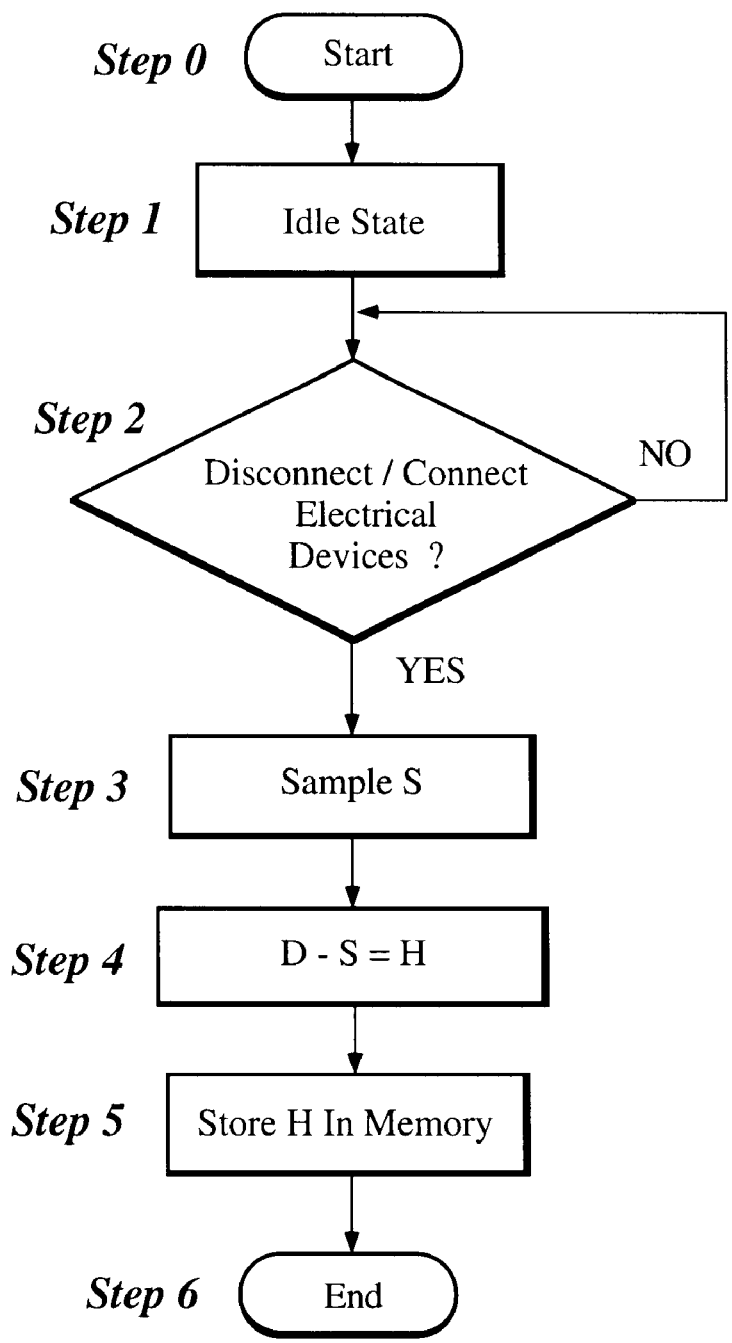
FIG. 9 is a flow chart showing a routine for determining an adjustment value of the throttle angle in accordance with another embodiment having features in accordance with the present invention.

With reference next to FIG. 9, another embodiment of a method for determining the throttle opening adjustment value H is provided. As with the embodiment described above in connection with FIG. 8, the engine is in an idle state during the process, and determining the adjustment value H is accomplished by subtracting the sensed throttle valve opening S from the actual idle opening D. The throttle opening adjustment value H is then stored in the ECU 194.

To trigger the calculation of the adjustment value H, certain electronic devices that are connected to the ECU are connected and disconnected from the ECU in accordance with a predetermined pattern. The ECU senses the disruption in the signal supplied from the input source (e.g., the sensor(s)). This pattern of connecting and disconnecting such electronic devices functions as a signal to the ECU to begin determining the throttle valve adjustment value H, and requires no physical switch in order to send the signal to start the calculation routine. Instead, during manufacture or setup of the engine and/or after shipping of the watercraft, the operator or service/preparation personnel connects or disconnects the prescribed electronic devices in accordance with a pattern determined by the manufacturer. As an example, one such pattern for triggering the determination of the throttle opening adjustment value H involves disconnecting and reconnecting the oxygen sensor 298 to the ECU 194 input side twice, then disconnecting and reconnecting the shift sensor 310 to the input side of the ECU once and then again disconnecting and reconnecting the oxygen sensor 298 to the input side of the ECU twice.

If this pattern is performed when the engine is in the idle state, the ECU recognizes this as a trigger for starting a determination of the throttle opening adjustment value H. Of course, it is to be understood that any number or variation of patterns involving any chosen electronic devices can be used. Additionally, the pattern is preferably somewhat complex and involves disconnecting and reconnecting certain sensors at least twice so that there is not an inadvertent triggering of the determination of the throttle adjustment value H. Also, although it is most preferred that the electronic devices are connected and disconnected from the input side of the ECU, it is also possible to have a pattern that prescribes connecting and disconnecting such devices from the output side of the ECU.

Figure 10:
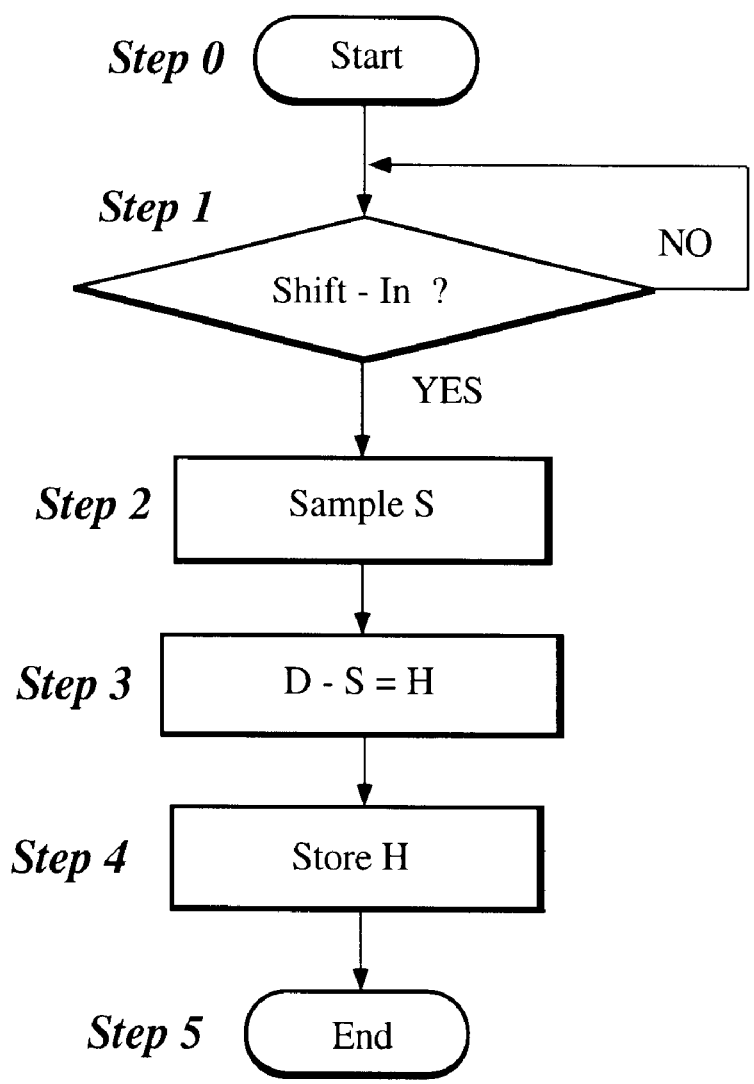
FIG. 10 is a flow chart showing a routine for determining an adjustment value of the throttle angle in accordance with yet another embodiment having features in accordance with the present invention.

With reference next to FIG. 10, yet another embodiment of a method for determining the throttle valve adjustment value H is provided. As with the above embodiments, the adjustment value H is calculated by subtracting the sensed throttle value opening S at the idle position from the actual idle opening D. The adjustment value H is stored in the ECU memory.

The determination of the throttle opening adjustment value H is triggered by shifting the transmission 246 from the neutral to the forward or reverse gear. At such a shifting event, the engine of the outboard motor will be in an idle state. When the ECU senses such a shift, the process of determining the adjustment value H is triggered.

This embodiment is especially advantageous because the adjustment value H can be updated relatively often. Thus, even if a power voltage of the battery 220 decreases as time passes, or if the mounting position of the throttle opening sensor 280 somehow shifts, the throttle opening adjustment value H is updated so that an accurate adjusted throttle opening K is nearly always available for use by the ECU in making calculations. In this manner, more correct and consistent control of the engine is anticipated and provided.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Moreover, many of the steps of the routines described above can be performed in various orders, as will be well understood by one skilled in the art from the above description, while still carrying out one or more objects or advantages of the present invention. Thus, it is intended that the scope of the present invention herein disclosed should not be limited by the particular disclosed embodiments described above, but should be determined only by a fair reading of the claims that follow.

What is claimed is:

1. An internal combustion engine configured to drive an output device through a transmission, the engine comprising a combustion chamber, an air intake passage arranged to introduce air to the combustion chamber, a throttle valve moveably disposed within the air intake passage for admitting the air in proportion to an opening degree thereof, a throttle valve opening sensor arranged to sense the opening degree and to output an opening degree signal, a fuel injector arranged to supply fuel to the combustion chamber, and a control unit configured to determine an amount of the fuel to be supplied based at least upon the opening degree signal, the control unit having a memory, an actual opening degree of the throttle valve at an engine idle position and a correction value being stored in the control unit memory, the correction value being a difference between the stored actual opening degree of the throttle valve at engine idle and an opening degree signal sensed by the throttle valve opening sensor at engine idle, a trigger being connected to the control unit to prompt the control unit to recalculate the correction value, the trigger comprising a sensor positioned to detect the shift of the transmission from a neutral condition to a drive condition.

2. The internal combustion engine of claim 1, wherein the control unit comprises non-volatile memory.

3. The internal combustion engine of claim 2, wherein electrical erasable programmable read-only memory (EEPROM) defines the non-volatile memory.

4. The internal combustion engine of claim 1, wherein the engine powers a marine propulsion device.

5. The internal combustion engine of claim 4, wherein the marine propulsion device comprises an outboard motor.

6. The internal combustion engine of claim 1, wherein the fuel injector injects fuel into said air intake passage such that the fuel is supplied to the combustion chamber through an intake port.

7. The internal combustion engine of claim 1 additionally comprising at least one stop adapted to prevent the throttle valve from closing beyond an engine idle position.

8. A control method for an engine including a fuel injector, an air intake passage having a throttle valve, the throttle valve movable between an idle position and a second position, a throttle valve opening sensor adapted to sense the opening degree and to output an opening degree signal, and a control unit having a memory, the control method comprising precisely measuring an actual opening degree of the throttle valve at the idle position, storing the actual idle opening degree in the memory, sensing the opening degree signal from the throttle valve opening sensor at the idle position, determining a correction value by computing the difference between the stored actual idle opening degree and the sensed opening degree signal, storing the correction value in the memory, and determining an adjusted throttle opening degree by applying the correction value to the opening degree signal from the throttle valve opening sensor, wherein the correction value is determined only after a trigger signal has been recognized by the control unit, the trigger signal being generated by electrically disconnecting and connecting one or more specific engine components to the control unit according to a prescribed pattern.

9. The control method of claim 8, wherein an amount of fuel sprayed by the fuel injector is controlled based at least partly upon the adjusted throttle opening degree.

10. The control method of claim 8 additionally comprising storing at least one actual idle opening degree and the correction value in the memory of the control unit.

11. The control method of claim 8, wherein the prescribed pattern comprises disconnecting and reconnecting a first engine component at least twice.

12. The control method of claim 8, wherein the prescribed pattern comprises disconnecting and reconnecting a plurality of engine components.

13. The control method of claim 8, wherein at least one of the engine components comprises a sensor.

14. The control method of claim 8, wherein the prescribed pattern comprises disconnecting and reconnecting at least one of the engine components from an input side of the control unit.

15. The control method of claim 8, wherein the prescribed pattern comprises disconnecting and reconnecting at least one of the engine components from an output side of the control unit.

16. The control method of claim 8, wherein the throttle valve opening sensor senses the opening degree by sensing the rotation of a throttle valve shaft.

17. The control method of claim 8, wherein the throttle valve opening sensor senses the opening degree by sensing a gap between the throttle valve and a reference point.

18. A control method for a motor comprising an engine coupled to a transmission, the motor having a throttle valve movable between an idle position and a second position, a throttle valve opening sensor adapted to sense the extent of opening of the throttle valve and to output an opening extent signal, a shift sensor adapted to sense when the transmission is shifted from a neutral condition to a driving condition and to ouput a shift-in signal, and a control unit having a memory and being adapted to receive the opening extent signal and the shift-in signal, the control method comprising computing a throttle valve opening sensor correction value upon actuation of a trigger of the control unit and storing the correction value in the control unit memory, wherein the trigger is actuated when the shift-in signal indicates that the transmission is shifted from a neutral condition to a driving condition.

19. The control method of claim 18 additionally comprising computing and storing a new correction value each time the trigger of the control unit is actuated, wherein the new correction value replaces the previous correction value in the control unit memory.

20. The control method of claim 18 additionally comprising storing at least one actual idle opening extent and the correction value in the memory of the control unit.

21. The control method of claim 20, wherein the correction value is a difference between the stored actual idle opening extent and the opening extent sensed by the throttle valve opening sensor when the trigger is actuated.

22. The control method of claim 18 additionally comprising determining an adjusted throttle opening extent by applying the correction value to the opening extent signal.

23. A control method for an engine having a throttle valve movable between an idle position and a second position, a throttle valve opening sensor adapted to sense the extent of opening of the throttle valve and to output an opening extent signal, and a control unit having a memory and being adapted to receive the opening extent signal, the control method comprising computing a throttle valve opening sensor correction value upon actuation of a trigger of the control unit and storing the correction value in the control unit memory, wherein the trigger is actuated by electrically disconnecting and connecting specific engine components to the control unit according to a prescribed pattern.

24. The control method of claim 23 additionally comprising computing and storing another correction value each time the trigger of the control unit is actuated, wherein the new correction value replaces the previous correction value in the control unit memory.

25. The control method of claim 23, wherein the prescribed pattern comprises disconnecting and reconnecting a first engine component at least twice.

26. The control method of claim 23, wherein the prescribed pattern comprises disconnecting and reconnecting a plurality of engine components.

27. The control method of claim 23, wherein at least one of the engine components comprises a sensor.

28. The control method of claim 23, wherein the prescribed pattern comprises disconnecting and reconnecting at least one of the engine components from an input side of the control unit.

29. The control method of claim 23, wherein the prescribed pattern comprises disconnecting and reconnecting at least one of the engine components from an output side of the control unit.

* * * * *